DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JUNE 1, 1971

827 O.G. 6

T887,011

AMMONIA-BROMOTRIFLUOROMETHANE FIRE EXTINGUISHING COMPOSITION

Howard Elliot Phillips, Wilmington, Del., assignor to E. I. du Pont de Nemours and Company, Wilmington, Del.

Filed July 31, 1970, Ser. No. 60,097
Int. Cl. C09k *3/28*
U.S. Cl. 252—8.1
No Drawing. 9 Pages Specification

The addition of ammonia sufficient to supply at least 4 vol. percent of ammonia to an area containing an explosive mixture of air and volatilized flammable compound reduces by at least 2 vol. percent the amount of expensive bromotrifluoromethane fire retardant that must be introduced into the area to inert the explosive mixture.